July 6, 1948.  C. F. MILLER  2,444,894
MULTIPLE SELECTION PATTERN MECHANISM
Filed Sept. 27, 1945  3 Sheets-Sheet 1
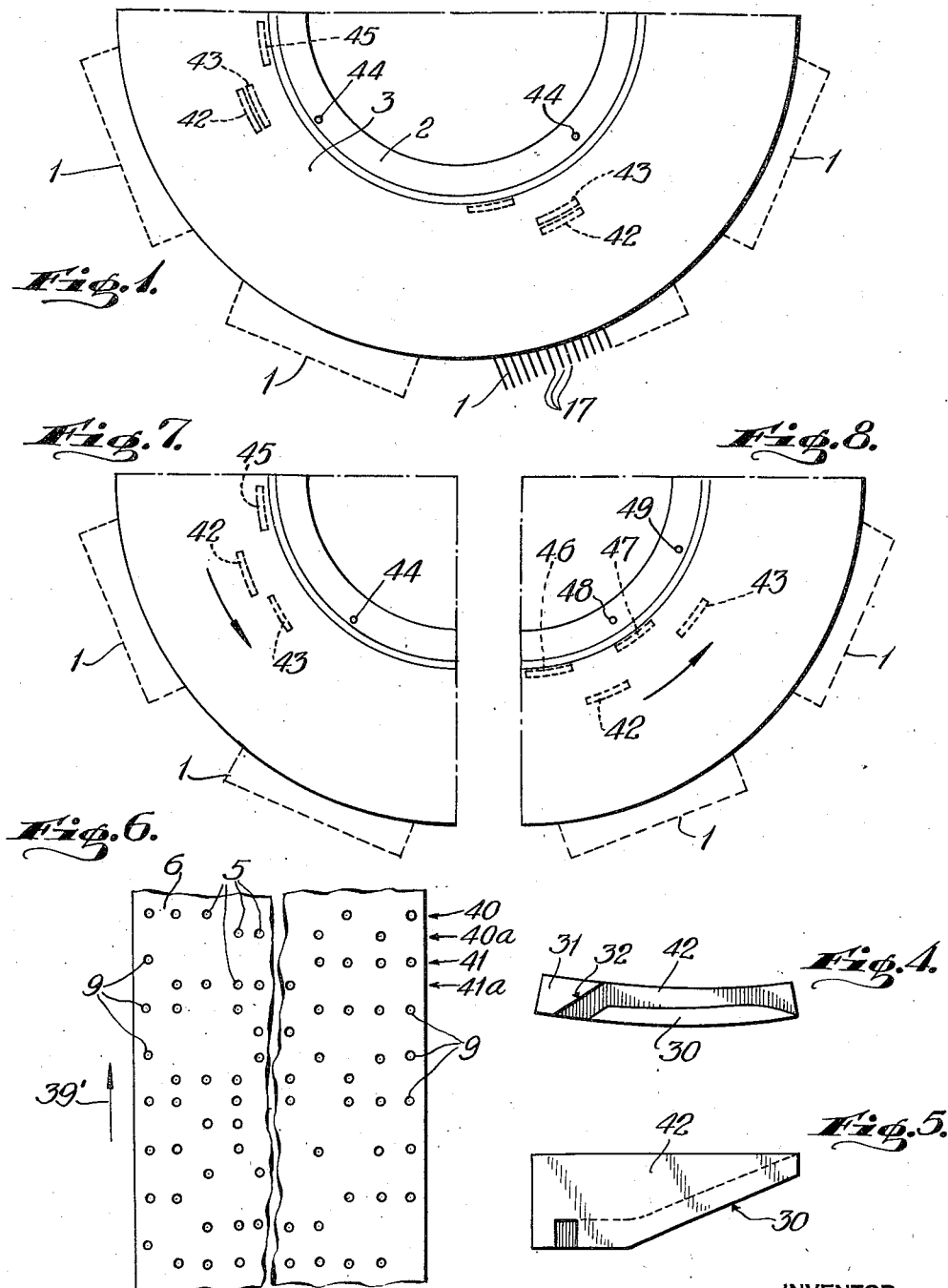

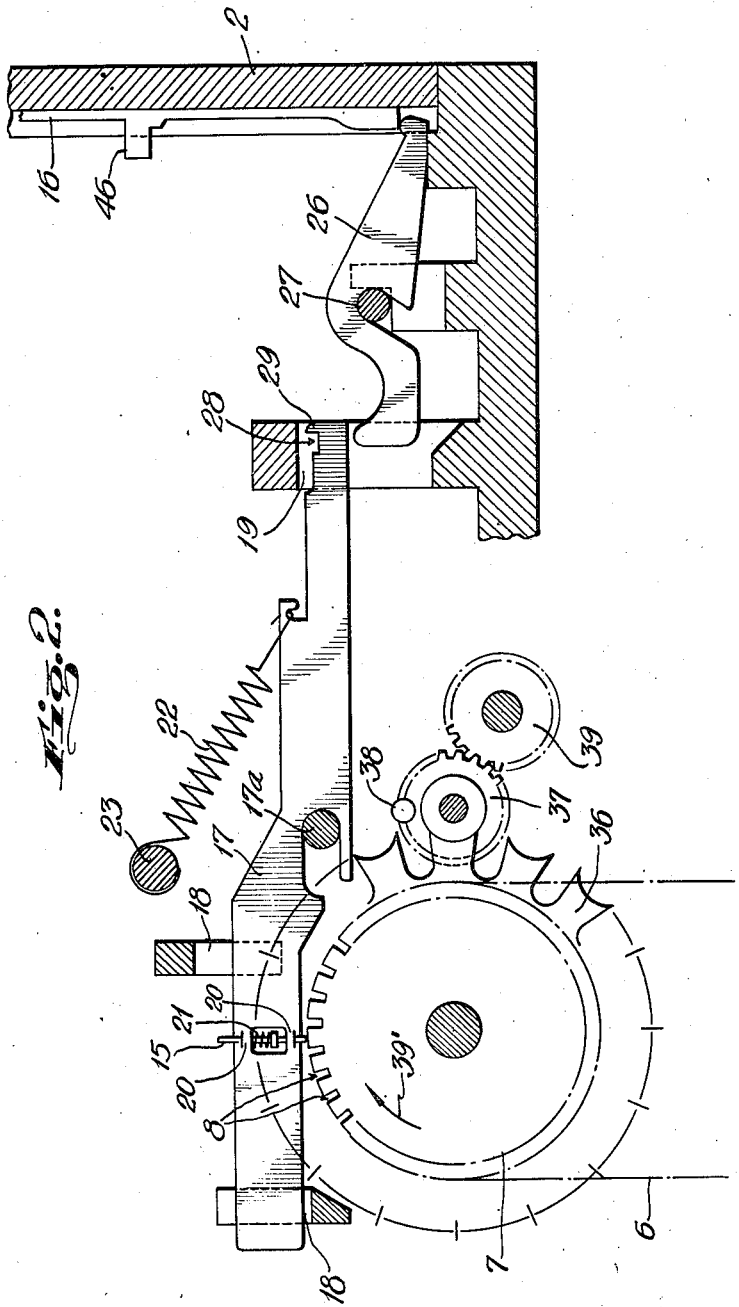

July 6, 1948.  C. F. MILLER  2,444,894
MULTIPLE SELECTION PATTERN MECHANISM
Filed Sept. 27, 1945  3 Sheets-Sheet 3
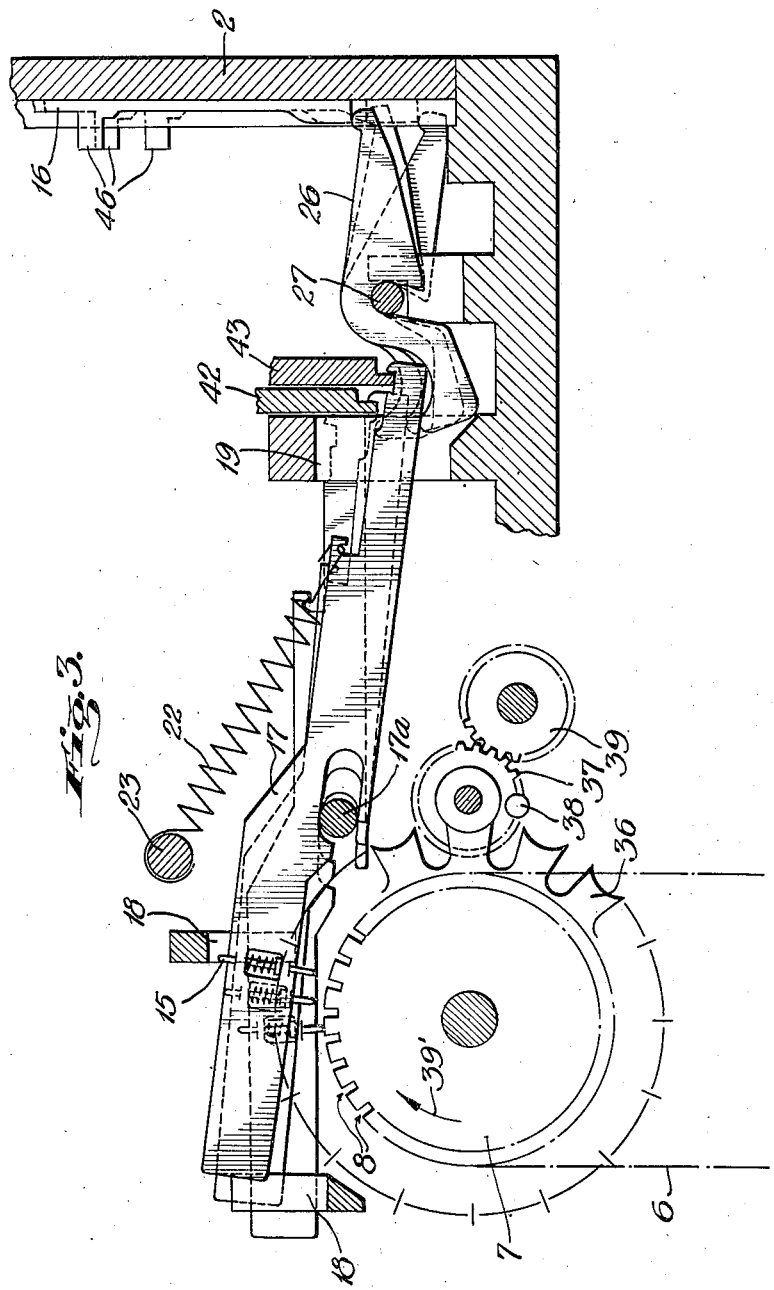
INVENTOR
Charles F Miller
BY Jeffery, Kimball & Eggleston
His ATTORNEYS Patented July 6, 1948

2,444,894

UNITED STATES PATENT OFFICE 2,444,894

MULTIPLE SELECTION PATTERN MECHANISM

Charles F. Miller, Philadelphia, Pa., assignor to Jacquard Knitting Machine Co., Inc., Philadelphia, Pa., a corporation of New York Application September 27, 1945, Serial No. 618,897

10 Claims. (Cl. 66—50)

My invention relates to pattern mechanisms of the type which, as commonly found in commercial practice, utilize perforated patterns, and more especially to that sub-type of such pattern mechanisms in which the couplers that transmit the calls of the pattern on the pattern feelers, or those members of the couplings that are located immediately at the pattern, respond to pattern calls while the pattern is advancing to bring further pattern calls toward the feeling positions of the feelers. It will be evident however that the invention is applicable also to pattern mechanisms wherein the pattern calling agencies are projections, or otherwise are other than perforations.

Pattern mechanisms of the perforated-pattern type as commonly used, are capable of only one selection. That is to say, while such a mechanism is capable of controlling the operations of many controlled elements, it is capable of directing only one kind of change in the operations in any one of the controlled elements; for example, directing that a controlled element move to some certain position in lieu of remaining in another, or directing that the controlled element perform a particular movement in lieu of performing another movement, etc. Speaking generally my invention permits selection from among a number of operations. For example, a pattern mechanism embodying my invention may direct a controlled element to move to any desired one of a number of possible positions in lieu of remaining at another, or it may direct a controlled element to perform any desired one of a number of possible movements in lieu of another movement, etc. The invention is of general utility, and applicable to operations of all kinds, and also to any number of variations except as limited by constructional difficulties.

Briefly I accomplish such results by providing, as it were, in each group of pattern calls, a number of possible positions, differing with respect to the direction of movement of the pattern, wherein a pattern calling agency (e. g. a perforation) for any particular feeler may be located, so that as any group of pattern calling agencies arrives at its feelers, a pattern call for any particular feeler may arrive at its feeler early or late, or perhaps at some time or times intermediate early and late. Accordingly each coupler whose feeler finds a pattern call responds correspondingly distinctively, i. e. early or late, or perhaps at an intermediate time; or by movement to any one of a corresponding number of different positions. With this I use a number of devices to act through or otherwise act responsive to the coupler actions to effectuate the calls on the controlled elements, the number of these devices corresponding to, say, the number of possible positions that a pattern call for any particular feeler may occupy in one group of calls, and each of those devices being active only in response to, say, one of the various distinctive actions of the couplers, e. g. one being active in response to movement of those couplers that move early or in response to those couplers that have moved a considerable distance, another being active in response to movement of those couplers that start later or in response to those couplers that move a lesser distance, etc. Speaking generally, the number of possible positions provided for a pattern call for any feeler in any group of pattern calls, is made equal to the number of desired variations in the operations of the controlled elements, and each position corresponds to one of them. By these means therefore a group of pattern calls may direct a selected lot of its controlled elements to do a certain thing, another selected lot of similar elements to do another thing, a third selected lot to do still a third thing, etc., each action being dependent on the particular position in which a pattern call is located. Of course each of these actions may be in lieu of still another action (or inaction) brought about by, as it were, omitting to provide a pattern call, although properly speaking the omission of a pattern call in the form of a perforation or projection should be regarded as a pattern call. Correspondingly too, any one of the controlled elements may be directed by one group of calls to do one thing, and by another group directed to do another thing, etc.

Pattern mechanisms of the sub-type here concerned are now used commonly, and perhaps most commonly, to control the actions of sliding needles in circular knitting machines having stationary needle cylinders. Accordingly in the accompanying drawings I have illustrated one form of my invention incorporated in a well-known form of pattern mechanism applied to the control of stitching elements of such a machine, and for simplicity and conciseness I have described this mechanism, for the most part, as directing the formation of knit and tuck stitches in lieu of welt stitches, the latter being formed by inaction of the needles and wholly omitting pattern calling agencies (i. e. perforations) at places in the pattern corresponding to places in the fabric where such stitches are desired. The broader and general application of the invention, both as to the form of the pattern mechanism and as to the instruments, operations and machines to which it is applicable, will be understood therefrom.

In those drawings too, it is to be understood, many parts of the machines shown not directly concerned with the invention have been omitted for clarity of illustration. Fig. 1 is a diagrammatic plan view illustrating the application of sectionalized pattern mechanisms to circular knitting machines and also illustrating one of the possible angular relations of some of the parts. Fig. 2 is a section through one of the pattern mechanism sections and a small portion of the knitting machine, the parts being shown in the positions they occupy shortly prior to the bringing of a new group of pattern calls to the pattern feelers. Fig. 3 is a section similar to Fig. 2 but showing the actions at a later time. Fig. 4 shows the lower edge of one of the coupler actuating cams of Fig. 3, and Fig. 5 is a face view of that cam. Fig. 6 illustrates a portion of a typical paper pattern of my invention. Figs. 7 and 8 are plan views of knitting machines to illustrate other possible cam relations of my invention.

As indicated in Fig. 1, the pattern mechanism per se illustrated is divided into a number of more or less separate sections 1 distributed around the knitting machine. Each is mounted on the machine in some convenient manner. As will be understood from prior practices, the pattern mechanism is divided into separate sections in order that it may serve all or a considerable part of the whole machine. Each section however is complete in itself and serves an individual discrete section of the machine, and may be like every other section. Therefore a description of the construction and operation of one of the pattern sections will suffice for the present purposes. The needle cylinder of the knitting machine is indicated at 2, and 3 in Fig. 1 is simply a cover plate protecting mechanism of the machine and pattern mechanism below it as will be understood.

As is common in this type of pattern mechanism, the pattern 6 is an endless band, and the pattern calling agencies are perforations 5 arranged in rows extending transversely of the band. This is shown representatively in Fig. 6. In service the pattern or band 6 is mounted on a rotary drum 7 which has a number of slots 8 extending longitudinally of the drum. The rows of perforations 5 of the pattern 6 are arranged to fall successively on the slots 8 as the drum is rotated. To assure register of the pattern perforations 5 with the slots 8, the edges of the pattern 6 are provided with rows of holes 9 to receive pins projecting from the ends of the drum 7 and carry the pattern band along as the drum is rotated, all as is quite well-known. As is common also the pattern perforations 5 are arranged not only in rows transversely of the pattern, but also in rows lengthwise of the pattern as will be seen in Fig. 6. For each of these longitudinal rows of pattern perforations, a feeler 15 having a point to engage with and feel the pattern as the pattern advances, is provided, together with an associated coupler to transmit the calls of the pattern 6 on the feelers 15 to the controlled elements 16 of the, say, needle cylinder 2. As is common, there may be a coupler for each element 16 of the machine. In a knitting machine, the elements 16 may be needles, or jacks or other devices acting on needles, or pressers, sinkers, etc. or 16 may be stitch-transferers, etc. In the present instance each coupler or coupling member is in the form of lever 17 fulcrumed and slidable longitudinally on the common bar 17a (say one bar 17a for each pattern mechanism section), and supported in vertical position by such combs, so-called, 18 and 19 as may be necessary; these combs 18 and 19 consist primarily of a series of thin walls, the space between each two of which contains on of the levers 17 quite loosely. As is common practice each feeler 15 illustrated is a short length of wire or bar mounted vertically in a couple of straps 20 formed by slotting and raising the sheet metal of its lever 17, and is pressed downwardly lightly by an individual spring 21, all as will be understood from the drawings and is in accordance with common practice. Also each lever 17 is provided with a spring 22 that tends to pull the lever lengthwise away from the center of the knitting machine (to the left in Figs. 2 and 3), and also to turn the lever to press its feeler 15 against the pattern 6; the various springs 22 of a pattern section may be carried by a single transverse bar 23.

In the present instance a lever 26 underneath the inner end of each of the levers 17 continues the respective coupling to, say, the cylinder 2 where it extends beneath, say, one of the controlled elements 16, so that the latter may be lifted by turning the respective lever 26 from its Fig. 2 position. The various levers 26 of any section may be mounted on a common bar 27 acting as a fulcrum for the whole group of levers 26 of the respective pattern mechanism section.

In operation the pattern drum 7 is rotated step by step to advance the pattern underneath the row of feelers 15 (which also, it will be observed, extends substantially transversely of the direction of advance of the pattern) and bring new calls, i. e. rows of pattern perforations 5 to the feelers in this their rest position. By preference the drum when stopped, is stopped with one of interslot walls beneath the feeling or rest positions of the feelers 15 as shown in Fig. 2. As turning of the drum 7 brings a pattern perforation 5 to a feeler 15, the feeler finding the perforation (and each feeler finding a perforation), is thrust through the perforation into the drum slot 8 below it by its spring 21 and the continued or subsequent turning of the drum actuates or acts through the fallen feelers to thrust the respective levers inwardly to positions dependent on the extent of movement of the pattern 6 from the time the respective feelers find perforations to the time the pattern drum comes to rest. Cams (e. g. 42) rotating about the axis of the knitting machine, pass over the inner ends of those levers 17 that have been thrust inwardly recently, and thereby actuate the corresponding levers 26 and therethrough raise the corresponding controlled members 16 as will be understood from Fig. 3. The distance each controlled member is raised is dependent on the depth of the cam acting on its levers at the time. The turning of an inward lever 17 by a cam also raises the feeler of that lever from the slot in the pattern drum (Fig. 3). The inner end of each lever 17 is notched at 28 however, primarily to provide a projection 29 to engage the inner face of a cam depressing the lever, and thus hold the lever inwardly against the pull of the lever spring 22 until the cam leaves the lever. When this happens the spring 22 of the respective lever returns the lever to its outer or pattern-feeling position (determined by the fulcrum bar 17a for example) and deposits its feeler onto the pattern again. Commonly the lower edge of each cam is provided with a rib 30 to enter the notches 28, with the result that the projections 29 engage the inner face of this rib, and a downward projection 31 with a cam face 32 to engage the opposite edge of the projections 29, may be provided at the trailing end of the lower edge of each cam to assure the prompt starting of the levers toward their outer positions (Figs. 4 and 5).

As is common practice the pattern drum 7 is rotated step by step by a Geneva wheel 36 fastened to the drum, and a cooperating pin wheel 37 (38 is the pin of the pin wheel) which is driven by the constantly driven gear wheel 39.

All the matter so far described is substantially conventional, and the practice heretofore has been to advance the pattern each step a distance equal to the distance between two adjacent horizontal rows of the pattern calling agencies (perforations); i. e. to advance the pattern such a distance between each two successive passages of the cam or cams, e. g. 42, that depress the inwardly thrust levers 17 to transmit the calls to the controlled elements 16. For example, in the particular sort of pattern mechanism illustrated in the drawings, prior practices would have the number of slots in each Geneva wheel 36 equal the number of slots 8 in the face of its pattern drum 7.

In accordance with the present invention however, as many transverse rows of pattern calling agencies of the pattern 6 are carried to the feelers 15 in each period of advance (and for each cycle of operations of the cams that act on inwardly thrust levers 17 to transmit calls to controlled elements 16) as there are variations to be made in the action of the controlled elements. Thus in the instance illustrated, in lieu of a welt stitch the pattern mechanism may direct the formation of either a knit stitch or a tuck stitch, i. e. there are two variations. Accordingly two transverse rows of the pattern perforations 5 of the pattern 6 are to be presented to the feelers 15 in each period of advance of the pattern, and accordingly (in the particular mechanism illustrated) there are two longitudinal slots 8 in the pattern drum for each pin slot in the periphery of the Geneva wheel 36; by way of example, thirty-two slots 8 are employed and sixteen pin slots in the Geneva wheel. Thus, the arrows 39' in Figs. 2 and 6 showing the direction of advance of the pattern 6, the rows 40 and 40a of Fig. 7 may be the two rows of pattern perforations 5 that will be brought to the row of feelers 15 as the pin 38 next steps the pattern drum 7 ahead one step, and the rows 41 and 41a of Fig. 7 will be presented to the row of feelers 15 whenever the pattern drum 7 is stepped ahead a second time; etc. for all the rows of pattern perforations of the endless pattern band 6. In effect, rows 40 and 40a form a group of pattern-calling agencies, rows 41 and 41a form another group, etc.

It will be understood of course that wherever there is no perforation in the pattern beneath one of the feelers 15, this feeler is held elevated in the position shown in Fig. 2, and accordingly is held above any slots 8 that may pass below it at the time. On the other hand, whenever one of the pattern perforations comes below one of the feelers 15, that feeler is thrust downwardly through the perforation into drum slot 8 below quite as before and together with its lever 17 is thrust inwardly, i. e. toward the right in Fig. 2, say by the slot wall pressing on the feeler, until its pattern drum 7 comes to rest in its new position. It follows accordingly that a feeler 15 that finds a perforation in row 40 of the pattern is carried farther inwardly than a feeler 15 that finds a pattern perforation in the row 40a, and accordingly any lever 17 may be moved inwardly to either one of two positions (Fig. 3), or of course may be left at rest in its outer position, Fig. 2, by providing no pattern perforation 5 for the feeler of that particular lever in either row 40 or row 40a.

Additionally, according to my invention, in the present instance, the actuator for the couplers and coupling members 17, to transmit the pattern calls onwardly, comprises, for say each feed, as many cams as there are rows of pattern-calling agencies in each group of those agencies, i. e. a cam 42 is provided to act responsive to (in the present case act on the inner ends of) those levers 17 that are thrust to their middle position, i. e. by finding perforations in row 40a and a cam 43 is provided to act responsive to (e. g. on the inner ends of) the levers 17 that are thrust to their innermost position, i. e. at the direction of pattern calling perforations in row 40. As will be understood from prior practices and from the cam placements in Fig. 1, the pattern 6 of one pattern mechanism section 1 may be advanced and its selected levers 17 thrust inwardly in accordance with the new calls during the time the cams 42 and 43 are acting at another or other pattern mechanism sections. As either of the cams 42 and 43 actuate, i. e. press down the inner ends of levers 17 that have been thrust into their path, they thereby actuate corresponding levers 26 and therethrough the corresponding stitch-forming element 16, as will be understood from Fig. 3. One of these cams, say 43, is of full depth so that it raises its controlled elements 16 to such a position that a knit stitch is formed (by it or by an associated needle) from a related yarn guide 44 (Fig. 1), and the other cam 42 is of lesser depth so that the stitch-forming elements 16 actuated by it are raised only high enough to form tuck stitches.

With two such cams, i. e. knit and tuck, the two may be placed side by side, i. e. in the same angular position as will be understood from Figs. 1 and 3. To return the controlled elements 16 to their lower or Fig. 2 position, an appropriate cam or cams 45 may be provided to act on their butts 46 for example, or this may be done in other manners. For example, if elements 16 are needles, the cam or cams 45 may be stitch cams. Their angular relation to the lever cams 42 and 43 is shown in Fig. 1. A single yarn guide 44 will serve both lever cams 42 and 43 in such instances, at least usually.

As another form however, the lever cams 42 and 43 may be placed one in advance of the other as shown in Fig. 7 for example. A cam or cams 45 to return the controlled elements 16 after action by 42 and 43 (for example a stitch cam in the simplest form), may be placed in the relative position shown also in Fig. 7. In such instances as these the lever cams, e. g. 42 and 43, may or may not be of the same depth, depending upon the results to be secured. Both may be served by the same yarn guide 44.

Another possible relation of the cams is illustrated in Fig. 8. In this arrangement the lever cams 42 and 43 are displaced angularly one in advance of the other, and each is followed by a cam or cams 46 or 47 to restore actuated controlled elements 16 to their initial starting positions. In the simplest forms, 46 and 47 may be stitch cams, and both lever cams 42 and lever cam 43 may be suitable to form or to cause the formation of knit stitches, or otherwise. The cam set 42 and 46 may then be served by a yarn guide 48 and the cam set 43 and 47 may be served by another yarn guide 49. With such an arrangement, for example, two feeds may be served by a single operation by a pattern mechanism section and stitches formed from two different yarns.

In so far as the foregoing description refers to operations from the rows 40 and 40a of the pattern calling agencies or perforations, it will be observed that the same type of operations occur as the rows 41 and 41a are brought later to the row of feeders 15, and subsequently operations of the same type recur as each subsequent pair of pattern calling rows is brought to action. It will be understood of course that the various parts of mechanism mentioned are supported in any way that may be convenient. For simplicity and clarity of illustration, such supports and many other parts having to do with the knitting machines but not concerned with this invention, have been omitted from the drawings.

It will be understood also that my invention is not limited to those details of construction and operation that have been described above, except as appears hereafter in the claims.

I claim:

1. The combination of a plurality of elements to be controlled, a pattern having pattern calling agencies arranged in groups substantially transversely of the direction of advance of the pattern, coupling members and cooperating feelers to feel the pattern arranged substantially transversely of the pattern, each of said coupling members being movable along with the advancing pattern on the engagement of its feeler with a pattern calling agency, means responsive to such movement of said coupling members to cause actuation of said controlled elements, and means to advance the pattern to bring new groups of pattern calling agencies to the feelers, characterized by the fact that in individual of said groups pattern calling agencies are disposed in different positions with respect to the direction of advance of the pattern, whereby coupling members whose feelers find pattern calling agencies in such a group respond differently one from another, and said means responsive to movement of said coupling members comprises a plurality of devices active with respect to different movements of the coupling members.

2. The combination of a pattern having pattern calling elements arranged in rows substantially transversely of the direction of advance of the pattern, feelers arranged substantially transversely of the direction of advance of the pattern, coupling members associated with said feelers, means to move along with the advancing pattern those of said coupling members whose feelers find pattern calling agencies and to so move each of such coupling members in a particular manner dependent on the position on the pattern of the pattern calling agency to which it responds, a plurality of devices to transmit calls on the coupling members and each responsive to a particular manner of such movement of coupling members, and means to advance the pattern to present a plurality of rows of pattern calling agencies to the feelers in an interval equal to the interval between the beginnings of two successive cycles of operation of said plurality of call-transmitting devices.

3. The combination of a drum to carry a pattern and having longitudinal slots in its face to receive feelers passing through perforations in the pattern, a plurality of coupling members having feelers arranged lengthwise of the drum, means to turn the drum step by step, each step turning the drum a peripheral distance equal to the peripheral space occupied by a plurality of said slots and therewith moving each coupling member having a feeler in a slot in a manner corresponding to the relative location of the slot occupied by its feeler, and a plurality of devices responsive to different movements of said coupling members by said drum to transmit the pattern calls onward.

4. The subject matter of claim 3 characterized by the fact that said plurality of devices comprises at least one set of cams equaling in number the number of slots in each of said plurality of slots, and said means to turn the drum, turns the drum one step for each pass of a set of said cams past said coupling members.

5. The combination of a pattern having pattern calling agencies arranged in rows substantially transversely of the direction of advance of the pattern, coupling members, each of said coupling members having a feeler point to feel said pattern calling agencies and the said feeler points being disposed in a row substantially transversely of the direction of advance of said pattern, means to actuate such of said coupling members as have pattern calling agencies presented to their said feeler points, means to restore actuated coupling members to their initial positions, and means to advance the pattern to present a plurality of its rows of pattern controlling agencies to the said row of feeler points, in an interval equal to the interval between the beginnings of two successive actions of said means for restoring said coupling members to their initial positions.

6. In a pattern mechanism controllable by a pattern, a feeler and an associated call-transmitting coupler, a coupler actuator to actuate said coupler to transmit pattern calls onward from the coupler, said actuator and coupler being so related that the actuator actuates the coupler differently when the coupler occupies different positions in its path, and pattern-advancing means to advance the pattern to bring successive pattern-calling agencies of the pattern to said feeler successively, said feeler having a rest position through which the pattern passes in engagement with the feeler as the pattern is advanced to advance its pattern-calling agencies, and being movable with the pattern advancing through the rest position when encountered by at least some of the pattern-calling agencies to cause its associated coupler to move within the path of the coupler actuator, and said coupler actuator being actable on said coupler only once for each period in which said pattern advancing means advances through said rest position a sufficient portion of the pattern to contain at least two pattern-calling agencies for said feeler.

7. In a pattern mechanism controllable by a pattern, a feeler and an associated call-transmitting coupler, a support occupying a substantially fixed position to hold the pattern in engagement with said feeler, pattern-advancing means to advance the pattern over said support, in engagement with said feeler, to bring pattern-calling agencies of the pattern to the feeler successively, and a coupler actuator to actuate said coupler to transmit pattern calls onward from the coupler, said feeler being movable with the advancing pattern when encountered by at least some of said pattern-calling agencies to cause its associated coupler to move within the path of said actuator, said actuator and coupler being so related that the actuator actuates the coupler differently when the coupler occupies different positions within its path, and said actuator being actable on the coupler only once for each period in which the pattern-advancing means advances onto said support a sufficient portion of the pattern to contain at least two pattern-calling agencies for said feeler.

8. The combination of a plurality of elements to be controlled, a pattern having a series of pattern-calling agencies for each of said plurality of elements, each of said series being arranged lengthwise of the pattern, a pattern feeler for each of said plurality of elements, pattern-advancing means to advance the pattern to bring successive pattern-calling agencies to said feelers, the feelers having rest positions in which they are arranged substantially in a row extending substantially transversely of the pattern and in their rest positions engaging with the pattern to feel the same for pattern-calling agencies while the pattern advances, a coupler connected to each of said feelers, an actuator to actuate said couplers to transmit pattern calls onward from the couplers, said actuator and couplers being so related that the actuator actuates the couplers differently when they occupy different positions relative to the actuator, and at least one feeler actuator to engage the feelers as they encounter pattern-calling agencies respectively, and move said feelers along with the advancing pattern and thereby move their respective couplers within the path of said coupler actuator, the coupler actuator being actable on the said couplers only once for each period in which a sufficient length of the pattern advances through the rest position of the feelers to contain at least two pattern-calling agencies for each feeler.

9. The subject matter of claim 8, characterized by the fact that the pattern-advancing means advances the pattern step by step, the feeler actuator moves the feelers engaged thereby to the ends of the respective step advances of the pattern, thereby moving each feeler encountered by a pattern-calling agency, and its coupler, a distance dependent on the position of the pattern-calling agency lengthwise of the pattern, and said coupler actuator has at least two parts, one to actuate couplers moved a certain distance and another to actuate couplers moved by their feelers a greater distance.

10. The subject matter of claim 9, characterized by the fact that a drum, rotatable as the pattern advances, is provided to support the pattern at the rest positions of the feelers, the pattern-calling agencies are perforations in the pattern, the surface of the drum is provided with openings, to receive feelers passing through the perforations of the pattern, the walls of the openings in the drum engage the feelers as the drum rotates to advance them with the pattern, thereby constituting said feeler actuators, and said two parts of the coupler actuator are two cams which, while said drum and pattern are at rest, pass over the couplers that have been moved by their feelers.

CHARLES F. MILLER.

REFERENCES CITED

The following references are of record in the file of this patent:

UNITED STATES PATENTS

| Number | Name | Date |
|---|---|---|
| 891,216 | Heath | June 16, 1908 |
| 1,797,069 | Britton | Mar. 17, 1931 |
| 1,994,653 | Korber | Mar. 19, 1935 |
| 2,281,721 | Sirmay | May 5, 1942 |
| 2,395,823 | Hayhurst | Mar. 5, 1946 |

FOREIGN PATENTS

| Number | Country | Date |
|---|---|---|
| 113,675 | Australia | Aug. 14, 1941 |
| 237,961 | Great Britain | Aug. 4, 1925 |
| 244,462 | Germany | Mar. 9, 1912 |